US010513053B2

(12) United States Patent
Zook et al.

(10) Patent No.: US 10,513,053 B2
(45) Date of Patent: Dec. 24, 2019

(54) CPVC PIPE FITTING HAVING IMPROVED RESISTANCE TO ENVIRONMENTAL STRESS CRACKING

(71) Applicant: Lubrizol Advanced Materials, Inc., Cleveland, OH (US)

(72) Inventors: Christopher D. Zook, Akron, OH (US); Mark D. Julius, Avon, OH (US)

(73) Assignee: Lubrizol Advanced Materials, Inc., Cleveland, OH (US)

(*) Notice: Subject to any disclaimer, the term of this patent is extended or adjusted under 35 U.S.C. 154(b) by 312 days.

(21) Appl. No.: 15/536,792

(22) PCT Filed: Dec. 17, 2015

(86) PCT No.: PCT/US2015/066280
§ 371 (c)(1),
(2) Date: Jun. 16, 2017

(87) PCT Pub. No.: WO2016/100614
PCT Pub. Date: Jun. 23, 2016

(65) Prior Publication Data
US 2017/0368717 A1 Dec. 28, 2017

Related U.S. Application Data

(60) Provisional application No. 62/094,308, filed on Dec. 19, 2014.

(51) Int. Cl.
| | | |
|---|---|---|
| *B29B 13/02* | (2006.01) | |
| *C08F 8/22* | (2006.01) | |
| *C08F 14/06* | (2006.01) | |
| *C08F 14/16* | (2006.01) | |
| *C08L 27/24* | (2006.01) | |
| *F16L 9/128* | (2006.01) | |
| *F16L 47/30* | (2006.01) | |
| *B29L 23/00* | (2006.01) | |
| *B29K 27/06* | (2006.01) | |

(52) U.S. Cl.
CPC .............. *B29B 13/025* (2013.01); *C08F 8/22* (2013.01); *C08F 14/06* (2013.01); *C08F 14/16* (2013.01); *C08L 27/24* (2013.01); *F16L 9/128* (2013.01); *F16L 47/30* (2013.01); *B29K 2027/06* (2013.01); *B29L 2023/001* (2013.01); *B29L 2023/22* (2013.01); *C08F 2500/17* (2013.01)

(58) Field of Classification Search
CPC ......... B29B 13/025; B29B 13/00; C08F 8/22; C08F 14/06; C08F 14/16; F16L 9/128; F16L 47/30; C08L 27/24
See application file for complete search history.

(56) References Cited

U.S. PATENT DOCUMENTS

| | | | |
|---|---|---|---|
| 3,488,406 A | 1/1970 | Sehm | |
| 2003/0157321 A1 | 8/2003 | Dalal | |
| 2007/0205004 A1* | 9/2007 | Perkovich | .............. A62C 35/68 169/43 |

FOREIGN PATENT DOCUMENTS

| | | |
|---|---|---|
| EP | 0808851 A2 | 11/1997 |
| WO | 0123469 A1 | 4/2001 |
| WO | 2009058768 A1 | 5/2009 |
| WO | 2013166107 A1 | 11/2013 |
| WO | 2014143623 A1 | 9/2014 |
| WO | 2016100597 | 6/2016 |

OTHER PUBLICATIONS

European Patent Office, International Search Report dated Feb. 12, 2016 for PCT/US15/066280.
European Patent Office, Written Opinion dated Feb. 12, 2016 for PCT/US15/066280.

* cited by examiner

*Primary Examiner* — James M Hewitt, II
(74) *Attorney, Agent, or Firm* — Christopher P. Demas; Teresan W. Gilbert

(57) ABSTRACT

The disclosed technology relates to a plastic compound suitable for preparing articles, such as pipe fittings and valves, with good physical properties, such as impact strength, and resistance to environmental stress cracking (ESC). In particular, the technology relates to a vinyl chloride resin, which includes chlorinated polyvinyl chloride ("CPVC") homopolymer. Furthermore, the invention relates to vinyl chloride homopolymer compounds containing the vinyl chloride homopolymer resin, and articles made from such compounds, which compounds meet 23447 cell classifications under ASTM D1784.

11 Claims, No Drawings

CPVC PIPE FITTING HAVING IMPROVED RESISTANCE TO ENVIRONMENTAL STRESS CRACKING

BACKGROUND OF THE INVENTION

The disclosed technology relates to a plastic compound suitable for preparing articles, such as pipe fittings and valves, with good physical properties, such as impact strength, and resistance to environmental stress cracking (ESC). In particular, the technology relates to a vinyl chloride resin, which includes chlorinated polyvinyl chloride ("CPVC") homopolymer. Furthermore, the invention relates to vinyl chloride homopolymer compounds containing the vinyl chloride homopolymer resin, and articles made from such compounds, which meet 23447 cell classifications under ASTM D1784.

Polyvinyl chloride (PVC) is a vinyl chloride polymer having about 57 mol % chlorine bound along a polymerized ethylene backbone. Chlorinated polyvinyl chloride (CPVC) is a post-chlorinated form of PVC typically having greater than 57 mol % bound chlorine. CPVC is known to have excellent high temperature performance characteristics, among other desirable physical properties.

CPVC is an important specialty polymer due to its high glass transition temperature, high heat deflection temperature, outstanding flame and smoke properties and chemical inertness. While the glass transition temperature of the CPVC generally increases as the amount of chlorine increases, increased chlorine content causes the CPVC to become more difficult to process and products made therefrom to become more brittle. In this regard, it is known that CPVC resins generally have low impact properties and often require compounding with impact modifiers.

It is also known that CPVC resins are subject to environmental stress cracking. Many polymeric materials, loaded mechanically and immersed in certain kinds of liquids, undergo failures by crazing and/or cracking. The loads required are much less than those required of failures in air. The failure promoting liquids are non-solvents and chemically inert for polymers. Failures like these are called environmental stress crazing (ESCR), environmental stress cracking (ESC), and environmental stress failure (ESF) which includes both.

In simple terms, ESC occurs from an external or internal crack in a plastic caused by tensile stresses less than the plastic's short term mechanical strength, resulting in failure. The addition of an organic liquid (the environment) with the applied stress can result in ESC failures. In essence, the organic liquid wets the surface of the polymer and in combination with the tensile stress, accelerates the failure rate. This phenomenon was identified as far back as the 1940s in the general thermoplastics field.

Currently in the field of CPVC pipe fittings, recommendations are in place on construction practices that will limit contact of the CPVC pipe fitting with incompatible materials. However, a more fundamental approach for improving the resistance to ESC for CPVC articles is desired.

A CPVC resin that can be readily processed and that can be employed in a CPVC compound to produce a final product having improved resistance to environmental stress cracking, with at least maintained or improved impact strength over traditional CPVC compounds, and meeting cell class 23447 under ASTM D1784 would be desirable.

SUMMARY OF THE INVENTION

Surprisingly, the inventors have discovered that vinyl chloride homopolymer resins, in particular CPVC homopolymer resins prepared by chlorinating a vinyl chloride resin having an inherent viscosity of about 0.79 or greater have improved resistance to environmental stress cracking, and in some embodiments, such homopolymer resins chlorinated to a chlorine content of between about 63 or 64 to about 66.75 wt %. Even more surprising and contrary to expectation, compounds employing such resins provide impact strength at least equivalent, and often improved over that provided by standard vinyl chloride compounds prepared by chlorinating a vinyl chloride resin having an inherent viscosity of about 0.68 or less, and in particular, such standard vinyl chloride resins having a chlorine content of 67 wt % or greater. Likewise, the compounds employing such resins exhibit much improved chemical stability over standard vinyl chloride compounds.

Thus, one aspect of the invention relates to a fitting for joining pipe sections prepared from a chlorinated vinyl chloride (CPVC) compound. The CPVC compound can include (A) at least one high molecular weight CPVC resin, wherein said high molecular weight CPVC resin is prepared by chlorinating a vinyl chloride resin having an inherent viscosity of about 0.79 or greater. The high molecular weight CPVC resin is a homopolymer resin; that is, the high molecular weight CPVC resin consists essentially of CPVC. By consists essentially of, in the context of the high molecular weight CPVC resin, it is meant that the resin may contain a small amount of comonomer, such as, at levels of less than about 1% of the polymer, or less than 0.5%, or less than 0.25%. In some embodiments, the homopolymer consists solely of CPVC.

The CPVC compound can additionally include (B) at least one standard molecular weight CPVC resin, wherein said standard molecular weight CPVC resin is prepared by chlorinating a vinyl chloride resin having an inherent viscosity of 0.68 or less. However, it is preferred that such a standard resin is either not included or included at low levels, such as, for example, at a ratio of the high molecular weight CPVC resin to the standard molecular weight CPVC resin of 1:1 or greater.

In an embodiment, the high molecular weight CPVC resin in the CPVC compound can have a chlorine content of less than 67 wt. %, such as, from about 63 or about 64 to about 66.75 wt. % chlorine. In one embodiment, there is also provided a CPVC compound prepared from a CPVC resin having an inherent viscosity of less than 0.79 and a chlorine content of less than 67 wt. %, such as, from about 63 or about 64 to about 66.75 wt. % chlorine.

If a standard molecular weight CPVC resin is employed, the standard molecular weight CPVC resin can also have a chlorine content of less than 67 wt. %

In an embodiment, the CPVC compound can additionally contain (C) other additives. The other additive can include, for example, at least one of (1) stabilizers, (2) impact modifiers, 3) lubricants, (4) fillers, (5) colorants, and (6) combinations thereof.

In an embodiment, the CPVC compound can contain from about 0.1 to about 7.0 parts per one hundred parts of resin ("phr") of a stabilizer, such as, for example, at least one of (i) metal containing stabilizers, (ii) organic based stabilizers, (iii) zeolites, (iv) $C_6$ to $C_{12}$ metal carboxylates, or (v) combinations thereof.

In one embodiment, the CPVC compound can contain from about 4 to about 9 phr of an impact modifier, which may include, for example, at least one of (i) acrylic impact modifiers, (ii) methyl butadiene styrene (MBS) impact modifiers, (iii) acrylonitrile butadiene styrene (ABS) impact modifiers, (iv) chlorinated polyethylene (CPE), or (v) combinations thereof.

In a further embodiment, the CPVC compound can include about 2.5 phr or less of a lubricant, which may be, for example, at least one of (i) polyolefins, (ii) oxidized polyolefins, (iii) paraffin waxes, or (iv) combinations thereof.

The CPVC compound may also contain some polyvinyl chloride ("PVC") resin, but in an embodiment, the CPVC compound excludes PVC resin.

A further aspect of the invention is directed to the use of the CPVC compound to improve the resistance to environmental stress cracking of a fitting for joining pipe.

Another aspect of the invention relates to a method of providing an improved fitting for joining pipe having improved resistance to environmental stress cracking compared to fittings for joining pipe prepared from a CPVC compound having standard molecular weight CPVC resin. The method can include molding the improved fitting from a CPVC compound containing a high molecular weight CPVC resin having a chlorine content of less than 67 wt. %.

DETAILED DESCRIPTION OF THE INVENTION

Various preferred features and embodiments will be described below by way of non-limiting illustration.

One aspect of the present invention is a fitting for joining pipe. The fitting is prepare from a CPVC compound containing at least one high molecular weight CPVC resin.

Polymers are derived from the successive "linking" of monomers in a polymerization reaction. By linking, it is meant that the monomers become bonded together. The linking of monomers requires alteration of the chemical structures of the monomers for the purpose of freeing a bond the monomers can use to link by.

For example, the chemical structure of ethylene monomer is two $CH_2$ units connected by a double bond;

$H_2C\!=\!CH_2$.

When ethylene monomers are polymerized, or linked, the double bond is opened and becomes free to bond with another ethylene monomer;

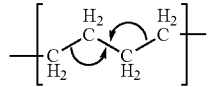

or otherwise represented as a repeating unit;

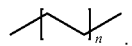

As can be seen, the repeating polyethylene unit is different from the starting ethylene monomer in that the double bond of the ethylene monomer has been opened. Although the polyethylene repeat unit is altered from the ethylene monomer from which it was derived, it is a common practice in the art of polymer plastics to refer to the repeating units of the polymer by the same name as the monomer. So, ethylene monomer refers both to $CH_2\!=\!CH_2$ and the polymerized repeat unit $-\![CH_2\!-\!CH_2]_n\!-$, where n is the number of repeat units in the polymer. Likewise, ethylene units or blocks of ethylene in the polymer means units or blocks derived from ethylene monomer. Similarly, styrene units or blocks of styrene in the polymer means units or blocks derived from styrene monomer, and so on for other types of monomers.

Those of ordinary skill in the art recognize that the polymerized monomer will be of altered chemical structure, but understand the relation between the repeat unit and the monomer from which the repeat unit was derived. Thus, as used in the description below and in the claims, monomer will refer both to a repeat unit of a polymer derived from the monomer, as well as the stand-alone monomer itself.

Accordingly, vinyl chloride monomer refers both to vinyl chloride monomer and the repeat unit derived from the vinyl chloride monomer:

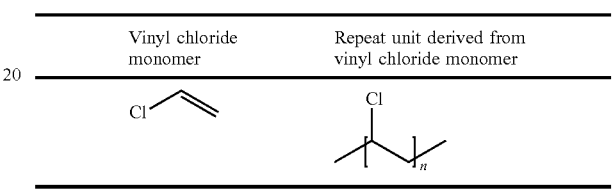

| Vinyl chloride monomer | Repeat unit derived from vinyl chloride monomer |
|---|---|

The high molecular weight CPVC resin refers to a polymer prepared from vinyl chloride monomer according to known polymerization methods and subsequently chlorinated. In an embodiment, the high molecular weight CPVC resin consists essentially of chlorinated vinyl chloride resin. In another embodiment, the high molecular weight CPVC resin consists of chlorinated vinyl chloride resin.

One method of characterizing the molecular weight of the polymerized vinyl chloride resin, prior to post-chlorination, is by reference to the inherent viscosity of the vinyl chloride resin. The higher the inherent viscosity of the vinyl chloride resin, the higher the molecular weight of the polymer.

The standard molecular weight CPVC resin employed in fittings for joining pipe is about 0.69 or less. Thus, in an embodiment, the high molecular weight CPVC resin can be prepared by chlorinating a vinyl chloride resin having an inherent viscosity of about 0.79 or greater, or greater than 0.92. In further embodiments, the high molecular weight CPVC resin can be prepared by chlorinating a vinyl chloride resin having an inherent viscosity of about 0.79 to about 1.3, or from 0.83 to about 1.2, or about 0.92 to about 1.5, or even from about 0.79 to about 1.02.

The high molecular weight CPVC resin may be post-chlorinated, that is, chlorinated after polymerization of the vinyl chloride monomer. Post-chlorinated, or simply chlorinated vinyl chloride resin can conveniently be made by the chlorination of vinyl chloride resin by any one of several available methods including a solution process, a fluidized bed process, a photo-slurry process, a thermal process or a liquid chlorine process. Examples of these processes can be found in U.S. Pat. Nos. 2,996,489; 3,100,762; 4,412,898; 3,532,612; 3,506,637; 3,534,013; 3,591,571; 4,049,517; 4,350,798; and 4,377,459. In a preferred embodiment, the high molecular weight CPVC resin can be made by a UV chlorination process, i.e. the CPVC is a UV-chlorinated resin. Likewise, in a preferred embodiment no swelling agent is employed when chlorinating the resin.

The high molecular weight CPVC resin may have a chlorine content of less than about 67 wt. %, or from between about 64 wt. % to about 66.75 wt. %. Preferably, the high molecular weight CPVC resin can have a chlorine content of from between about 64.5 wt. % and 66.65 wt. %, more preferably from between about 65 wt. % and 66.55 wt. %, and most preferably from between about 65.5 wt. % and 66.5 wt. %.

The high molecular weight CPVC resin can be employed in a CPVC compound, prepared, for example, according to the methods taught in the "Encyclopedia of PVC," Second Edition; Leonard I. Nass, Charles A. Heiberger or the "PVC Handbook," Charles E. Wilkes, James W. Summers, Charles Anthony Daniels, Mark T. Berard.

The CPVC compound can additionally include standard molecular weight CPVC resin prepared by chlorinating a vinyl chloride resin having an inherent viscosity of 0.68 or less, or less than 0.69, such as, for example, between about 0.65 to about 0.72. Preferably the CPVC compound will contain little to no standard molecular weight CPVC resin. However, in some embodiments the CPVC compound can contain a ratio of about 1:1 or greater, or greater than about 1:1, high molecular weight CPVC resin to standard molecular weight CPVC resin. In some embodiments, the ratio of the high molecular weight CPVC resin to the standard molecular weight CPVC resin in the CPVC compound can be from about 1:1 to about 1000:1, or from about 5:1 to about 500:1, or from about 10:1 to about 100:1.

If standard molecular weight CPVC resin is employed, it will preferably have a chlorine content matching that of the high molecular weight CPVC resin, that is, a chlorine content of from between about 64.5 wt. % and 66.65 wt. %, more preferably from between about 65 wt. % and 66.55 wt. %, and most preferably from between about 65.5 wt. % and 66.5 wt. %. The standard molecular weight CPVC resin, if used, can also have standard chlorine content of 67 wt. % or more.

The CPVC compound can additionally comprise other additives, such as those taught in the "Encyclopedia of PVC," Second Edition; Leonard I. Nass, Charles A. Heiberger or the "PVC Handbook," Charles E. Wilkes, James W. Summers, Charles Anthony Daniels, Mark T. Berard. For example, the CPVC compound can additionally comprise additives such as lubricants, impact modifiers, heat stabilizers or any other conventional additive. Ordinarily, a small amount of another resin or rubber, e.g., chlorinated polyethylene, styrene-acrylonitrile copolymer, or chlorinated isobutylene is blended with CPVC resin to improve its shock resistance and mechanical processability, and such additives are contemplated for the CPVC compound. Pigments, stabilizers, fillers, colorants, UV-stabilizers, and other processing aids, as well as other additives such as biocides or flame retardants, and any other plastic additive can also be incorporated in the CPVC compound.

The CPVC compound can include a heat stabilizer, or stabilizer for short. The stabilizer can comprise, consist essentially of, or consist of 1) an organic based stabilizer, and 2) a co-stabilizer system. By "consist essentially of" it is meant that the compound may include some small amount of other stabilizer in amounts insignificant to the stabilization of the product, generally in the range of less than 1 phr, or less than 0.75 phr or less than 0.5 phr, or even less than 0.25 phr.

In simplest terms, organic based stabilizers (OB-Stabilizers) are non-metal containing stabilizers based on organic chemistry. While the OB-Stabilizers suitable for the stabilizer system herein are not particularly limited, the most prevalent OB-Stabilizer compounds today include uracil and its derivatives. A common derivative of uracil suitable as an OB-Stabilizer for the composition herein is 6-amino-1,3-dimethyluracil. Other commercially available OB-Stabilizers suitable for the present composition include, for example, the Mark™ OBS™ line of stabilizers available from Galata™.

In general, the OB-Stabilizers can be included in the composition at levels required to meet physical properties, such as color. The OB-Stabilizers can be present in an amount of from about 0.05 or 0.1 to about 2.0 parts by weight per 100 parts by weight of said CPVC resin. In some embodiment, the OB-Stabilizers can be present from about 0.15 to about 1.75 phr, or from about 0.2 to about 1.5 phr, or even from about 0.25 or 0.5 to about 1.25 phr.

The co-stabilizer system can comprise, consist essentially of, or consist of at least one zeolite, at least one $C_6$ to $C_{12}$ metal carboxylate, or combinations thereof.

The co-stabilizer system can include an effective amount of at least one zeolite. Zeolites comprise basically a three dimensional framework of $SiO_4$ and $AlO_4$ tetrahedra. The tetrahedra are crosslinked through the sharing of oxygen atoms so that the ratio of oxygen atoms to the total of the aluminum and silicon atoms is equal to 2. This relationship is expressed as $O/(Al+Si)=2$. The electrovalence of the tetrahedra containing aluminum and silicon is balanced in the crystal by the inclusion of a cation. For example, the cation can be an alkali or alkaline earth metal ion. The cation can be exchanged for another depending upon the final usage of the aluminosilicate zeolite. The spaces between the tetrahedra of the aluminosilicate zeolite are usually occupied by water. Zeolites can be either natural or synthetic.

The basic formula for all aluminosilicate zeolites is represented as follows:

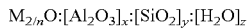

$$M_{2/n}O:[Al_2O_3]_x:[SiO_2]_y:[H_2O]_z$$

wherein M represents a metal, n represents the valence of the metal and X and Y and Z vary for each particular aluminosilicate zeolite. Essentially it is believed that any aluminosilicate zeolite can be used as a stabilizer in the instant invention, provided that the ratio of the silicon to aluminum in such aluminosilicate zeolite is less than 3.0 and that the aluminosilicate zeolite can be incorporated into the CPVC compound. Preferably, the zeolite ratio of silicon to aluminum in such aluminosilicate zeolite is less than 1.5. Most preferably, the ratio of silicon to aluminum in such aluminosilicate zeolite is about 1.

Example zeolites which can be used in the instant invention include but are not limited to zeolite A, described in U.S. Pat. No. 2,822,243; zeolite X, described in U.S. Pat. No. 2,822,244; zeolite Y, described in U.S. Pat. No. 3,130,007; zeolite L, described in Belgian Pat. No. 575,117 zeolite F, described in U.S. Pat. No. 2,996,358; zeolite B, described in U.S. Pat. No. 3,008,803; zeolite M, described in U.S. Pat. No. 2,995,423; zeolite H, described in U.S. Pat. No. 3,010,789; zeolite J, described in U.S. Pat. No. 3,011,869; zeolite P, described in U.S. Pat. No. 3,532,459, and zeolite W, described in U.S. Pat. No. 3,102,853.

The preferred zeolites can include, alone or in combination with another Group I metal, hydrated silicates of aluminum incorporating sodium, of the type $mNa_2O.xAl_2O_3.ySiO_2.zH_2O$. These preferred zeolites include zeolites A, P, X, and Y.

As a sole stabilizer, the zeolite can generally be present at from about 0.1 to about 4.0 phr. In some embodiments, the zeolite can be present from about 0.25 to about 3.5 phr, or 0.5 to about 3.0 phr. In a preferred embodiment, the zeolite can be present from about 0.75 to about 1.5 or 2.5 phr.

The co-stabilizer system can also include a metal carboxylate. The $C_6$ to $C_{12}$ metal carboxylate can be a metal salt of a saturated $C_6$, or $C_7$, or $C_8$ to $C_{11}$, or $C_{12}$ aliphatic carboxylate or di-carboxylate, an unsaturated $C_6$ to $C_{12}$ aliphatic carboxylate or di-carboxylate, a saturated $C_6$ to $C_{12}$ aliphatic carboxylate or di-carboxylate substituted with at least one OH group, or whose chain is interrupted by at least one oxygen atom (oxyacids), or a cyclic or bicyclic carboxylate or di-carboxylate containing from 6, or 7, or 8 to 11 or 12 carbon atoms. Suitable metals for the metal carboxylate can include Li, K, Mg, Ca, and Na.

Preferably the $C_6$, or $C_7$ or $C_8$ to $C_{11}$ or $C_{12}$ metal carboxylate is a sodium carboxylate, most preferably a disodium carboxylate, such as disodium sebacate, disodium dodecanedioate or disodium suberate, and combinations thereof. Other examples of $C_6$ to $C_{12}$ metal carboxylates that may be employed include disodium adipate, disodium azelate, and disodium undecanedioate.

The $C_6$ to $C_{12}$ metal carboxylate can be present from about 0.1 to about 4.0 phr. In some embodiments, the $C_6$ to $C_{12}$ metal carboxylate can be present from about 0.25 to about 3.0 phr, or 0.5 to about 2.5 phr. In a preferred embodiment, the $C_6$ to $C_{12}$ metal carboxylate can be present from about 1.0 to about 2.0 phr. The metal carboxylate can be dry blended with other ingredients of a compound or the CPVC resin can be coated with a metal carboxylate solution by a wet coating process followed by drying to obtain a metal carboxylate coated CPVC resin.

When in combination, the zeolite and $C_6$ to $C_{12}$ metal carboxylate can be present at levels that do not negatively affect the ability of the CPVC compound to meet physical property limitations and that avoid moisture foaming. In one embodiment the weight ratio of zeolite to the $C_6$ to $C_{12}$ metal carboxylate can be between about 6:1 to 1:6. In another embodiment, the weight ratio of zeolite to $C_6$ to $C_{12}$ metal carboxylate can be from about 5:1 to 1:5, or 4:1 to 1:4, or even 3:1 to 1:3. In some preferred embodiments the weight ratio of zeolite to $C_6$ to $C_{12}$ metal carboxylate can be from about 2:1 to 1:2, or even 1:1.

When employing a combination of zeolite and $C_6$ to $C_{12}$ metal carboxylate, the co-stabilizer system can be present at levels that do not negatively affect the ability of the CPVC compound to meet physical property limitations and that avoid moisture foaming. Generally, the co-stabilizer combined system can be present from about 0.1 to about 7.0 phr, more preferably 0.5 to about 6.0 phr, or 0.75 to about 5.0 phr. In some embodiments, the combined co-stabilizer system can be present from about 1.0 to about 4.0 phr, and more preferably 1.25 to about 3.0 phr.

In one embodiment, other co-stabilizers beside zeolite and carboxylate may also be employed in the co-stabilizer system. In an embodiment, the stabilizer system is essentially free of, or free of heavy metal stabilizers, such as tin stabilizers. By essentially free of it is meant that a minor portion may be present in amounts that do not contribute or contribute an insignificant amount to stabilization. In another embodiment, the stabilizer can include a heavy metal stabilizer, such as, for example, a tin stabilizer.

For most purposes, the stabilizer system including both the OB-Stabilizers and the co-stabilizer system can be present in amount of from about 0.1 to about 7.0 or 8.0 phr. Preferably, the stabilizer system of the combination can be present at about 0.5 to about 6, or from about 0.75 to about 5.0. In some embodiments, the stabilizer system including both zeolite and $C_6$ to $C_{12}$ metal carboxylate can be present in amount of from about 1.0 to about 4.5, or even 1.25 to about 3.0 or 4.0 phr.

Chlorinated polyethylene (CPE) can also be added to the CPVC compound. The CPE is a rubbery material resulting from the chlorination of polyethylene having a substantially linear structure. The polyethylene can be chlorinated by various methods including aqueous suspension, solution or gas phase methods. An example of a method for preparing CPE can be found in U.S. Pat. No. 3,563,974. Preferably, the aqueous suspension method is used to form the CPE. If used as an impact modifier, the CPE material contains from 5 to 50% by weight of chlorine. Preferably, the CPE contains from 25 to 45% by weight of chlorine. However, the CPE can comprise a mixture of chlorinated polyethylenes, provided that the overall mixture has a chlorine content in the range of about 25 to 45% by weight chlorine. CPE is commercially available from The Dow Chemical Company. The preferred CPE materials to be used in the compound include Tyrin™ 3611E, 2000 and 3615E; all available from the Dow Chemical Company. Tyrin is a trademark of the Dow Chemical Company.

The CPVC compounds may also include acrylic impact modifiers. U.S. Pat. No. 3,678,133 describes the compositions conventionally referred to as acrylic impact modifiers. Generally, the acrylic impact modifier is a composite interpolymer comprising a multi-phase acrylic base material comprising a first elastomeric phase polymerized from a monomer mix comprising at least 50 wt. % alkyl methacrylate having 1-4 carbon atoms in the alkyl group and having a molecular weight of from 50,000 to 600,000. Further, the patent states that the polymerization of the rigid thermoplastic phase is preferably conducted in such a fashion that substantially all of the rigid phase material is formed on or near the surface of the elastomeric phase. Acrylic impact modifiers are polyacrylates including ($C_4$-$C_{12}$) acrylate homo or copolymers, second stage graft copolymerized with methyl methacrylate and styrene, poly(ethylhexyl acrylate-co-butyl-acrylate) graft copolymerized with styrene, and/or acrylonitrile and/or methyl methacrylate; polybutyl acrylate graft polymerized with acrylonitrile and styrene. Examples of suitable acrylic impact modifiers include Paraloid™ EXL-2330, KM™ 330, 334, and 365; all of which are available from Dow Chemical Company. Paraloid is a trademark of the Dow Chemical Company. Additionally Durastrength™ 200, available from Arkema, and Kane Ace™ FM-10 and FM-25, available from Kaneka, are examples of commercially available acrylic impact modifiers.

Methyl butadiene styrene ("MBS") impact modifiers can also be added to the compounds of the present invention. MBS polymers are graft polymers. Generally, MBS impact modifiers are prepared by polymerizing methyl methacrylate or mixtures of methyl methacrylate with other monomers in the presence of polybutadiene or polybutadiene-styrene rubbers. Further information on MBS impact modifiers can be found in the Second Edition of the Encyclopedia of PVC, edited by Leonard I. Nass, Marcel Dekker, Inc. (N.Y. 1988, pp. 448-452). Examples of commercially available MBS impact modifiers include Paraloid KM™ 680, BTA™ 733, 751, and 753 available from Dow Chemical Company, Kane Ace™ B-22 impact modifier and Kane Ace™ B-56 impact modifier available from Kaneka.

Typical of the graft copolymer impact modifiers are those generally referred to as "ABS" resins, which may generally be described as copolymers of styrene and acrylonitrile on butadiene containing rubber. ABS modifiers are usually prepared by polymerizing styrene and acrylonitrile in the presence of polybutadiene rubber. Examples of commercially available ABS impact modifiers which can be used in the instant invention include Blendex 338, Blendex 310 and Blendex 311; all available from Galata Chemicals. If used as the impact modifier of choice, approximately 5 parts to about 15 parts of ABS impact modifier are used. Preferably, 6 parts of the ABS impact modifier are used.

Other additives can also be added to the CPVC compounds as needed. Conventional additives known in the art as well any other additives may be used, provided that the additive does not alter the physical properties and the process stability associated with the novel compounds. Examples of additives which can be used include antioxidants, lubricants, other stabilizers, other impact modifiers, pigments, glass transition enhancing additives, processing aids, fusion aids, fillers, fibrous reinforcing agents and antistatic agents.

Exemplary lubricants are polyglycerols of di- and tri-oleates, polyolefins such as polyethylene, polypropylene and oxidized polyolefins such as oxidized polyethylene and high molecular weight paraffin waxes. Since several lubricants can be combined in countless variations, the total amount of lubricant can vary from application to application. Optimization of the particular lubricant composition is not within the scope of the present invention and can be determined easily by one of ordinary skill in the art. Preferably, an oxidized polyethylene is used. An example of an oxidized polyethylene is AC 629A, sold by Honeywell. In addition to the oxidized polyethylene, preferably a paraffin wax may also be included in the compounds of the instant invention. An example of a paraffin wax is Rheolub 165 from Honeywell.

Suitable processing aids include acrylic polymers such as methyl acrylate copolymers. Examples of process aids include Paraloid K-120ND, K120N, K-175; all available from Dow Chemical Company. A description of other types of processing aids which can be used in the compound can be found in The Plastics and Rubber Institute: International Conference on PVC Processing, Apr. 26-28 (1983), Paper No. 17.

An example of antioxidants to be used in the halogen containing compounds include Irganox 1010 (tetrakis[methylene(3,5-di-tert-butyl-4-hydroxy-hydrocinnamate)]methane) sold by Ciba, if used at all.

Suitable pigments include among others titanium dioxide, and carbon black. Examples of titanium dioxide is Tiona RCL-6 and RCL-4 from Cristal. An example of carbon black is Raven 410, available from Columbian Chemicals.

Suitable inorganic fillers include talc, clay, mica, wollastonite, silicas, and other filling agents. The CPVC compound can also contain some small amounts of PVC resin, and in an embodiment, the CPVC compound will exclude PVC resin.

The CPVC compound can be processed into an article by generally accepted methods. For example, the CPVC compound can be molded, extruded, extruded and machined, or processed by any other known method.

In a preferred embodiment, the CPVC compound can be processed into fittings for joining pipe with particular utility in the production of fittings for hot water piping systems for industrial and domestic use. The CPVC compound can also be employed, for example, to produce building products, such as siding, fencing or fenestration products, irrigation products, pool and spa products, electrical application products, HVAC application products, furniture, and as drawn sheets for custom applications. In addition, the CPVC compound can be useful in the rigid vinyl field for the manufacture of other articles, such as, for example, ductwork, tanks, appliance parts, etc., especially where the products will handle or contact hot water and other hot or corrosive liquids.

The CPVC compound when properly extruded and formed desirably meets or exceeds the requirements of ASTM D 1784 cell class 23447 and provides long term performance and reliability, including a high degree of safety over continuous use. The first numeral "2" in the cell class specifies CPVC; the second numeral (whether "3" or "4") specifies the level of notched Izod impact strength ("3" indicates at least 80.1 J/m (1.5 ft. lb/in) of notch, "4" indicates at least 266.9 J/m (5 ft. lb/in) of notch); the third numeral "4" specifies tensile strength of at least 48.3 MPa (7,000 psi); the fourth numeral "4" specifies tensile modulus of at least 2482 MPa (360,000 psi); and the fifth numeral "7" specifies the level of distortion temperature under load (DTUL) or heat deflection temperature (HDT) measured under 1.82 MPa (264 psi) load. Numeral "7" indicates DTUL or HDT of at least 100° C. (see ASTM D1784).

In another aspect of the invention the high molecular weight CPVC resins and CPVC compounds can be employed to provide improved chemical stability of an article in comparison to the same article made from a CPVC or PVC compound comprising a standard Mw (chlorinated) vinyl chloride (co)polymer resin. "Chemical stability" refers to the article's ability to resist environmental stress cracking failures.

Resistance to environmental stress cracking can be determined according to ISO 22088 (equivalent to ASTM F2331) under various stresses and with the application of various stress cracking promoters, such as, for example, corn oil, di(2-ethylhexyl) phthalate ("DOHP"), and various surfactants, and at a temperature of 23° C. Articles prepared from the compound comprising non-blended homopolymer resin ("non-blended compound" i.e. the resin in the compound is more than 98% by weight the high molecular weight CPVC resin) can exhibit a time to failure (ttf) of at least 1.25 times the number of hours as exhibited by the same compound containing a CPVC or PVC homopolymer resin having an IV of 0.68 or less. In another embodiment, the non-blended compound can achieve at least 1.5 or at least 2 times the number of hours, and in another embodiment, it can achieve at least 2.5 or 3 times the number of hours to failure as exhibited by the same compound containing a standard molecular weight CPVC or PVC resin. In blended compounds (i.e. compounds comprising both high molecular weight CPVC resin and standard Mw (chlorinated) vinyl chloride (co)polymer resin), the effect of the standard Mw resin will reduce the ESC ttf, but the blended compound will still be expected to exhibit a greater ttf due to the presence of the high molecular weight CPVC resin.

In another aspect of the invention the high molecular weight CPVC resins and CPVC compounds can be employed to maintain or improve impact strength as measured by the Izod or staircase methods. "Impact Strength" refers to the amount of force an article can withstand before fracturing. More specifically, the Izod impact test provides a laboratory measurement of the impact strength of a material by determining its maximum ability to absorb an impulse load, whereas the falling tup or staircase impact test provides a measurement of the impact strength for a material when extruded or molded into a fitting for joining pipe sections and encompasses both the material's impact strength and ductility.

Notably, the high molecular weight CPVC resins and compounds described herein can maintain suitable impact strength so as to maintain an article produced therefrom in the same class as if produced from the homopolymer.

Extruded or molded fittings for joining pipe sections made using a CPVC compound of the present invention that has at least equivalent, if not better impact strength than a standard molecular weight resin, and improved chemical resistance provides considerable advantages to one constructing or maintaining, for example, fittings for joining industrial pipes. With improved chemical resistance, the compound can be employed to produce fittings for joining pipe sections that can withstand environmental stress factors for a longer period of time than standard fittings.

It is known that some of the materials described above may interact in the final formulation, so that the components of the final formulation may be different from those that are initially added. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

Control—Resin Sample 1—CPVC prepared from 0.68 IV PVC and chlorinated to 67.3 wt. % Cl.

Resin Sample 2—CPVC prepared from 0.54 IV PVC and chlorinated to 67.3 wt. % Cl.

Resin Sample 3—CPVC prepared from 0.79 IV PVC and chlorinated to 67.3 wt. % Cl.

Resin Sample 4—CPVC prepared from 0.92 IV PVC and chlorinated to 67.3 wt. % Cl.

Compounds for ESC-ttf are prepared employing 100 parts of CPVC resin, 3.5 parts of a stabilizer package, 7.5 parts of impact modifier, 1.75 parts lubricant, and 3.5 parts filler. Results of testing the various sample resins is provided in Table 4. DTS Torque was measured by placing 72 grams of sample on a C. W. Brabender Instrument with an Intelli-Torque Plasti-Corder with torque rheometer head at a starting temperature of 200° C. and reporting the steady torque from the rheology curve.

TABLE #4

| | | Control Compound 1 Resin Sample 1 | Control Compound 2 Resin Sample 2 | Control Compound 3 Resin Sample 3 | Experimental Compound 1 Resin Sample 4 |
|---|---|---|---|---|---|
| | Resin (parts) | 100 | 100 | 100 | 100 |
| | DTS-torque, mg | 2190 | 1460 | 2670 | 3100 |
| | Notch Izod Impact (ft-lbs) (ASTM D256) | 2.68 | 1.8 | 4.7 | 13.9 |
| | Tensile Strength, psi (ASTM D638) | 7700 | 7300 | 7700 | 7700 |
| | Tensile Modulus, kpsi (ASTM (D638) | 375000 | 374000 | 374000 | 370000 |
| | Heat Deflection Temperature, F. (ASTM D648) | 104 | 99 | 105 | 105 |
| ESC-ttf (times relative to control compound 1) | Corn Oil | 1 | 0 | 4.4 | 7.3 |
| | DOHP | 1 | 1.8 | 1.6 | 4 |
| | Surfactant* | 1 | 0.8 | 9.5 | 12 |

*Quaternary ammonium chloride concentrate including the following chemicals (Water, Dimethyl Benzyl Ammonium Chloride(2.37%), Dimethyl Ethylbenzyl Ammonium Chloride (2.37%), Nonionic Surfactant and Sodium Carbonate)

Resin Sample 6—CPVC prepared from 0.68 IV PVC and chlorinated to 66 wt. % Cl.

Resin Sample 7—CPVC prepared from 0.68 IV PVC and chlorinated to 66.5 wt. % Cl.

Resin Sample 8—CPVC prepared from 0.68 IV PVC and chlorinated to 65.5 wt. % Cl.

Resin Sample 9—CPVC prepared from 0.79 IV PVC and chlorinated to 66 wt. % Cl.

Resin Sample 10—CPVC prepared from 0.79 IV PVC and chlorinated to 66.5 wt. % Cl.

Resin Sample 11—CPVC prepared from 0.79 IV PVC and chlorinated to 65.5 wt. % Cl.

Resin Sample 12—CPVC prepared from 0.83 IV PVC and chlorinated to 65.5 wt. % Cl.

Resin Sample 13—CPVC prepared from 0.92 IV PVC and chlorinated to 65.5 wt. % Cl.

Resin Sample 14—CPVC prepared from 0.92 IV PVC and chlorinated to 66.5 wt. % Cl.

Resin Sample 15—CPVC prepared from 0.92 IV PVC and chlorinated to 66.0 wt. % Cl.

TABLE #5

|  |  | Control Compound 4 Resin Sample 6 | Experimental Compound 4 Resin Sample 7 | Experimental Compound 5 Resin Sample 8 | Experimental Compound 6 Resin Sample 9 | Control Compound 5 Resin Sample 10 | Experimental Compound 7 Resin Sample 11 | Experimental Compound 8 Resin Sample 12 | Experimental Compound 9 Resin Sample 13 | Experimental Compound 10 Resin Sample 14 | Experimental Compound 11 Resin Sample 15 |
|---|---|---|---|---|---|---|---|---|---|---|---|
|  | Resin (parts) | 100 | 100 | 100 | 100 | 100 | 100 | 100 | 100 | 100 | 100 |
|  | DTS-torque, mg | 2050 | 1980 | 2170 | 2370 | 2520 | 2230 | 2455 | 2600 | 2950 | 2850 |
|  | Notch Izod Impact (ft-lbs) (ASTM D256) | 2.9 | 3.7 | 3.8 | 4.3 | 5.4 | 4 | 10 | 15.4 | 11.2 | 13.9 |
|  | Tensile Strength, psi (ASTM D638) | 7400 | 7700 | 7700 | 7500 | 7600 | 7600 | 7600 | 7300 | 7700 | 7500 |
|  | Tensile Modulus, kpsi (ASTM (D638) | 380000 | 380000 | 380000 | 378000 | 371000 | 374000 | 374200 | 370000 | 372000 | 378000 |
|  | Heat Deflection Temperature, F. (ASTM D648) | 102 | 99 | 99 | 103 | 103 | 98 | 99 | 99 | 103 | 1.4 |
| ESC-ttf (times relative to control compound 1) | Corn Oil | 1.9 | 0.8 | 2.9 | 6.0 | 4.1 | 6.8 | 12.5 | 32.3 | 16.4 | 18.6 |
|  | DOHP | 1.2 | 1.0 | 1.4 | 1.4 | 1.2 | 1.1 | 1.6 | 2.9 | 3.5 | 3.6 |
|  | Surfactant* | 5.5 | 2.9 | 5.1 | 6.9 | 6.3 | 6.2 | 8.3 | 11.3 | 8.0 | 8.7 |

*Quaternary ammonium chloride concentrate including the following chemicals (Water, Dimethyl Benzyl Ammonium Chloride(2.37%), Dimethyl Ethylbenzyl Ammonium Chloride (2.37%), Nonionic Surfactant and Sodium Carbonate)

Compounds for ESC-ttf are prepared according to the same formulation as provided for table 4. Results of testing are provided in Table 5.

Each of the documents referred to above is incorporated herein by reference. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

What is claimed is:

1. A fitting for joining pipe sections prepared from a chlorinated vinyl chloride (CPVC) compound, wherein the CPVC compound comprises (A) at least one chlorinated vinyl chloride homopolymer resin (CPVC resin) prepared by chlorinating a vinyl chloride resin having an inherent viscosity of about 0.79 to about 1.02 and a chlorine content of about 63 wt. % to about 66.75 wt. %.

2. The fitting of claim 1, wherein said CPVC compound additionally comprises (B) at least one CPVC resin prepared by chlorinating a vinyl chloride resin having an inherent viscosity of less than 0.68.

3. The fitting of claim 2, wherein the ratio of the CPVC resin prepared by chlorinating a vinyl chloride resin having an inherent viscosity of about 0.79 to about 1.02 to the CPVC resin prepared by chlorinating a vinyl chloride resin having an inherent viscosity of less than 0.68 is 1:1 or greater.

4. The fitting of claim 1, wherein said CPVC resin prepared by chlorinating a vinyl chloride resin having an inherent viscosity of less than 0.68 comprises a chlorine content of less than 67 wt. %.

5. The fitting of claim 1, wherein said CPVC compound further comprises (C) other additives.

6. The fitting of claim 5, wherein the other additive comprises at least one of (1) stabilizers, (2) impact modifiers, 3) lubricants, (4) fillers, (5) colorants, and (6) combinations thereof.

7. The fitting of claim 6, wherein the CPVC compound comprises a from about 0.1 to about 7.0 phr stabilizer comprising at least one of (i) metal containing stabilizers, (ii) organic based stabilizers, (iii) zeolite, (iv) $C_6$ to $C_{12}$ metal carboxylate, or (v) combinations thereof.

8. The fitting of claim 6, wherein the CPVC compound comprises from about 4 to about 8 phr an impact modifier comprising at least one of (i) acrylic impact modifiers, (ii) methyl butadiene styrene (MBS) impact modifiers, (iii)

acrylonitrile butadiene styrene (ABS) impact modifiers, (iv) chlorinated polyethylene (CPE), or (v) combinations thereof.

9. The fitting of claim 6 wherein the CPVC compound comprises 3.5 phr or less a lubricant comprising at least one of (i) polyolefins, (ii) oxidized polyolefins, (iii) paraffin waxes, or (iv) combinations thereof.

10. The fitting of claim 5, wherein the CPVC compound excludes polyvinyl chloride (PVC) resin.

11. A method of providing an improved fitting for joining pipe having improved resistance to environmental stress cracking compared to fittings for joining pipe prepared from a CPVC compound having chlorinated vinyl chloride homopolymer resin ("CPVC resin") prepared by chlorinating a vinyl chloride resin having an inherent viscosity of less than 0.68, comprising molding the improved fitting from a CPVC compound comprising CPVC resin prepared by chlorinating a vinyl chloride resin having an inherent viscosity of about 0.79 to about 1.02 and having a chlorine content of about 63 wt. % to about 66.75 wt. %.

* * * * *